United States Patent [19]

Knavish et al.

[11] Patent Number: 4,798,616
[45] Date of Patent: Jan. 17, 1989

[54] MULTI-STAGE PROCESS AND APPARATUS FOR REFINING GLASS OR THE LIKE

[75] Inventors: Leonard A. Knavish, Plum Boro, Pa.; David R. Haskins, Cumberland, Md.

[73] Assignee: PPG Industries, Inc., Pittsburgh, Pa.

[21] Appl. No.: 91,178

[22] Filed: Aug. 31, 1987

Related U.S. Application Data

[63] Continuation-in-part of Ser. No. 914,228, Oct. 2, 1986, abandoned.

[51] Int. Cl.⁴ .............................................. C03B 5/10
[52] U.S. Cl. ...................................... 65/135; 65/134; 65/136; 65/337; 65/346; 65/347
[58] Field of Search ................. 65/134, 135, 136, 337, 65/346, 347

[56] References Cited

U.S. PATENT DOCUMENTS

| | | |
|---|---|---|
| 704,040 | 7/1902 | Houze . |
| 1,941,778 | 7/1931 | Amsler . |
| 2,254,079 | 2/1940 | Alpine . |
| 2,691,689 | 10/1954 | Arbeit et al. . |
| 2,808,446 | 10/1957 | Lambert . |
| 2,926,208 | 2/1960 | Eden . |
| 2,990,438 | 6/1961 | Lambert et al. . |
| 3,260,587 | 7/1966 | Dolf et al. . |
| 3,261,677 | 7/1966 | Plumat . |
| 3,399,047 | 8/1968 | Brichard . |
| 3,415,636 | 12/1968 | Upton . |
| 3,499,743 | 3/1970 | Fanica et al. . |
| 3,592,623 | 7/1971 | Shepherd . |
| 3,819,350 | 6/1974 | Pellett et al. . |
| 3,897,234 | 7/1975 | Froberg . |
| 4,011,070 | 3/1977 | Hynd . |
| 4,099,951 | 7/1978 | Pieper . |
| 4,195,982 | 4/1980 | Coucoulas et al. . |
| 4,381,934 | 5/1983 | Kunkle et al. . |
| 4,632,687 | 12/1986 | Kunkle et al. . |

Primary Examiner—Arthur Kellogg
Attorney, Agent, or Firm—Dennis G. Millman

[57] ABSTRACT

In a method of making glass or the like, wherein the batch materials are liquefied in a distinct zone from the refiner, the liquefied material is heated in an intermediate stage before being fed to the refiner. In preferred embodiments the intermediate stage comprises one or more channels extending from the side of the refiner.

18 Claims, 2 Drawing Sheets

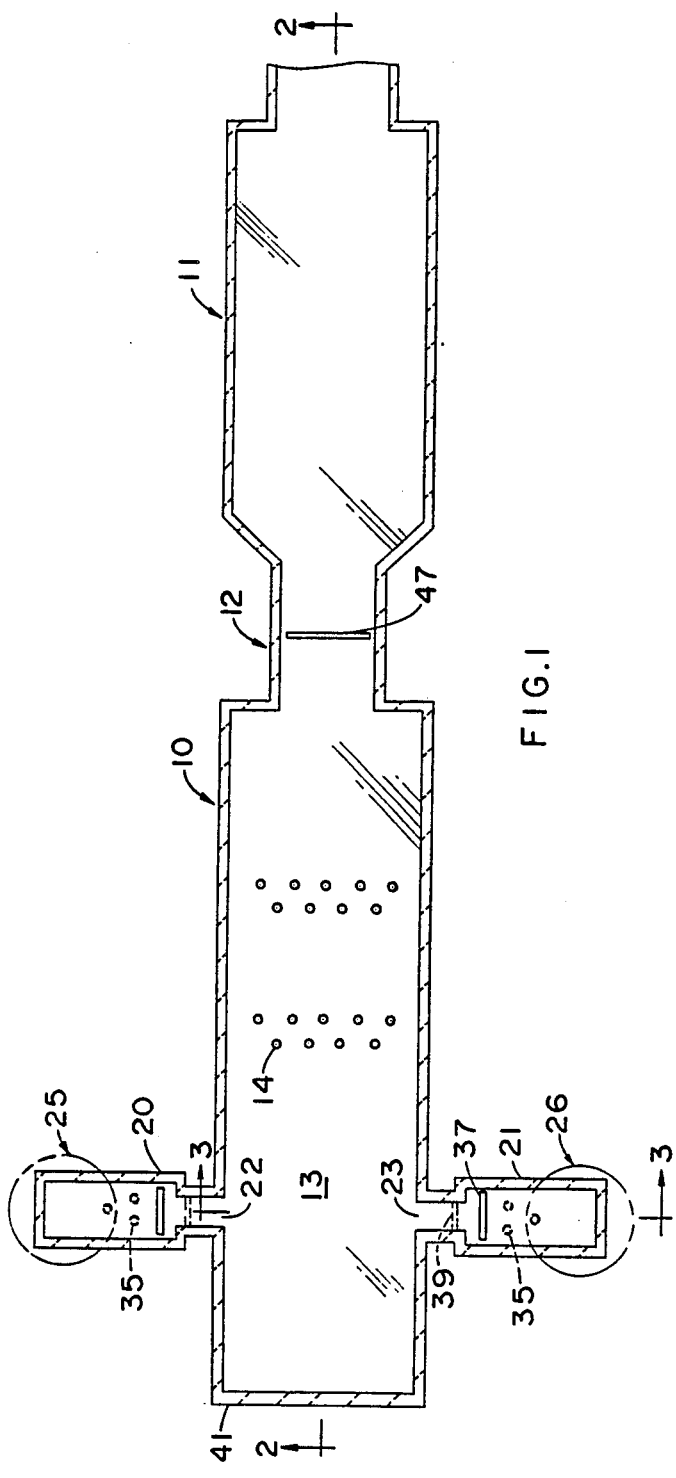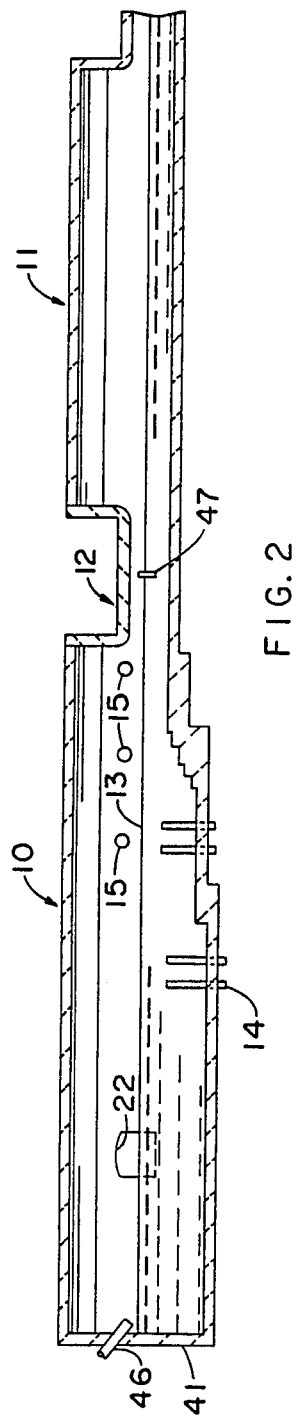

4,798,616

MULTI-STAGE PROCESS AND APPARATUS FOR REFINING GLASS OR THE LIKE

RELATED APPLICATION

This application is a continuation-in-part of U.S. application Ser. No. 914,228 filed on Oct. 2, 1986 now abandoned.

BACKGROUND OF THE INVENTION

The present invention relates to a staged process and apparatus for producing glass or the like, and more specifically, to improvements in the refining stage of such a process or apparatus. Although specifically applicable to production of vitreous glass products such as flat glass, fiber glass, container glass, or sodium silicate glass, the invention is also applicable to similar products that may not be considered "glass" under strict definitions. It should be understood that the term "glass" is used herein in the broader sense to include glass-like products. On the other hand, because of the higher standards for optical quality of flat glass, the improvements in refining achieved by the present invention are particularly significant to the production of flat glass.

In U.S. Pat. No. 4,381,934 to Kunkle et al. there is disclosed a process for performing the initial step of the melting process, rendering pulverulent batch materials to a liquefied, partially melted state. This process requires that the melting process be completed by a subsequent process stage for most glass products. Refining of the liquefied material would be a typical task of the subsequent process stage. In the aforesaid patent, it is disclosed that the refining may be carried out by feeding the liquefied material to a conventional tank-type melting furnace. In order to optimize the economies of construction and operation of such a staged melting and refining operation, it is desirable to carry out the refining in as efficient a manner as possible, thereby minimizing the size of the refining apparatus and the energy consumed therein.

In the melting of glass, substantial quantities of gas are produced as a result of decomposition of batch materials. Other gases are physically entrained by the batch combustion heat sources. Most of the gas escapes during the initial phase of melting, but some becomes entrapped in the melt. A primary objective of refining is to provide sufficient time and temperature conditions for substantial portions of these entrapped gases to be eliminated from the melt. Because elevated temperatures expedite the rise and escape of gaseous inclusions, the highest temperatures of the melting process are typically provided in the refining zone. Additionally, thermal conditions are conventionally controlled in the refining zone to maintain recirculating flows of the molten glass in order to provide adequate residence time and to assure that the throughput stream passes through the region at high temperatures, where gases are released into the space above the melt, and that unrefined portions of the melt are directed away from the throughput stream. Additionally, the refining stage may be employed to assure dissolution of any remaining solid particles of the batch. Furthermore, the recirculation established during refining can be useful in homogenizing the melt. It would be desirable to optimize the achievement of at least some, and preferably all, of these objectives of refining when coupled to a discrete liquefying stage as in U.S. Pat. No. 4,381,934. Prior to this invention, it was found that feeding liquefied material to a recirculatory refining tank has a tendency to create short-circuit flow patterns, whereby incoming material passes relatively quickly into the outgoing product stream, thus providing inadequate residence time for refining.

A difficulty arises from the fact that material discharged from a liquefying stage is only partially melted, typically being in a substantially foamy condition with unmelted solid particles. When such material is passed to a pool of molten glass in a refining furnace, the material tends to stratify near the surface of the pool. This stratified material has been found to not respond to the recirculating flows within the main portion of the pool that assure adequate residence time and temperature exposure to accomplish the refining step. Accordingly, discharging material from a liquefying stage directly to a recirculating refining furnace as shown in U.S. Pat. No. 4,381,934 has been found to yield inadequate refining.

Another problem is that maintaining the desired convection flow patterns in the refiner is more difficult when the material entering the refiner is liquefied. This is because in a conventional tank type melting and refining furnace the unmelted batch materials fed onto the molten pool serve as a heat sink at one end of the pool, thereb creating a downward flow in that region which contributes to sustaining a strong circulation pattern. Such an effect is not present to as great an extent when the batch materials are liquefied at a separate location. When there is insufficient recirculation in the refiner, the probability increases that a portion of the material will pass quickly to the outgoing product stream, thereby contaminating the product with inadequately refined glass.

In prior art glassmaking furnaces, the melt usually progresses from a relatively large melting chamber into smaller or narrower vessels for refining and conditioning, often passing through a constricted passageway in going from one chamber to the next. The following U.S. patents show typical compartmentalized glassmaking furnaces: U.S. Pat. Nos. 1,941,778; 704,040; 2,254,079; 2,808,446; 3,399,047; 3,897,234; 4,099,951; and 4,195,982. Heating molten glass in narrow passageways leading to refining chambers may be seen in U.S. Pat. Nos. 2,926,208; 2,990,438; 3,499,743; 4,011,070; 3,261,677; 3,415,636, and 2,691,689. None of these patents recognizes the effects on the efficiency of the refining process that have been found to be attributable to the thermal condition and physical orientation of the stream entering the refiner.

SUMMARY OF THE INVENTION

In the present invention, glass batch material or the like is liquefied and refined in discrete, physically separated stages, but instead of passing the liquefied material directly to the refining stage, it passes through an intermediate stage where it is readied for entry into the refiner. By providing an intermediate receiving vessel, the stratified foam layer can be held back from the refier, the temperature of the material can be increased so as to be more compatible with the desired convection flow patterns in the refiner, and undissolved sand grains and the like may be provided with sufficient residence time to substantially completely dissolve before entering the refiner.

A barrier preventing surface flow from the intermediate stage into the refiner is one embodiment for retaining the stratified material within the intermediate stage. Angled burners can also assist in detaining the foamed material at the inlet end of the intermediate stage.

By raising its temperature prior to introduction into the refiner, the liquefied material is thermally prepared for entry into the appropriate flow stream within the refiner so as to reinforce the desirable recirculating patterns. Preferably, the liquefied material is heated in the intermediate stage to a temperature higher than it entered from the liquefying stage, but lower than the peak temperature attained by the molten material in the refiner. Material from the liquefier that is not additionally heated sinks to the bottom of the refiner and enters inappropriate flow streams. Heating the material excessively before entering the refiner disadvantageously reduces the temperature differences within the refiner that provide a driving force for the desired circulation. It is also advantageous to direct the material from the intermediate stage into an upper elevation of the molten material in the refiner such as by means of a sill at the junction of the intermediate stage with the refiner.

A second aspect of the invention involves controlling conditions in the refiner itself so as to strengthen convection flow patterns in the melt in the refiner when receiving liquefied feed material, and involves several measures that may be implemented singly or in combination. One measure that may be taken is to provide sufficiently high temperatures in the "spring zone" or "hot spot" in the refiner, where there is a region of rising molten glass currents. Particularly useful in this regard is the use of submerged electrical heating in or near the spring zone. It is also desirable that a significant rearward flow (i.e., away from the outlet from the refiner) be maintained at the surface portion of the melt in the refiner upstream from the spring zone. For this purpose, an additional assist may be provided by feeding cullet to the upstream end of the refiner, which serves as a heat sink and promotes downward currents in that region.

A preferred embodiment for effecting the intermediate processing of liquefied material being fed to the refiner is an elongated, narrow channel. Typically, the channel has length and width considerably less than that of the refiner. Advantageously, a plurality of liquefying stages may feed a single refiner, in which case each is preferably provided with a channel connecting it with the refiner. Since the primary function of the channel is to permit the liquefied material to be heated to a higher temperature, substantial volume in the channel is not necessary. However, sufficient length to separate the input location from the output location is useful in providing residence time in the channel to perform the heating function. The channel lends itself to heating by means of electric resistance heating between submerged electrodes, but overhead combustion firing or other means of heating may be employed in addition to or instead of the electric heating. The opening between the channel and the refiner is preferably at an elevation above the level of the refiner bottom to assist entry into the appropriate elevation of the refiner.

Using the concepts of the present invention to feed liquefied material from a liquefaction stage to a refiner permits attainment of a sufficient level of refiner efficiency so that the size of the refiner can be minimized, thereby achieving economies in construction and operation.

A preferred feature of the present invention is that the channel or channels join the refiner at side portions thereof at a location between the upstream end wall of the refiner and the spring zone. Such an arrangement reduces the chances of newly introduced material being drawn directly into the lowermost flow stream in the refiner. Providing a pair of channels opposite each other is advantageous, but it has been found that an asymmetrical arrangement with a single side channel can be operated satisfactorily.

THE DRAWINGS

FIG. 1 is a top view in cross-section of a preferred embodiment of the present invention showing a pair of channels feeding a refiner.

FIG. 2 is a cross-sectional side view of the embodiment of FIG. 1, taken along line 2—2 in FIG. 1.

DETAILED DESCRIPTION

Figure 3:
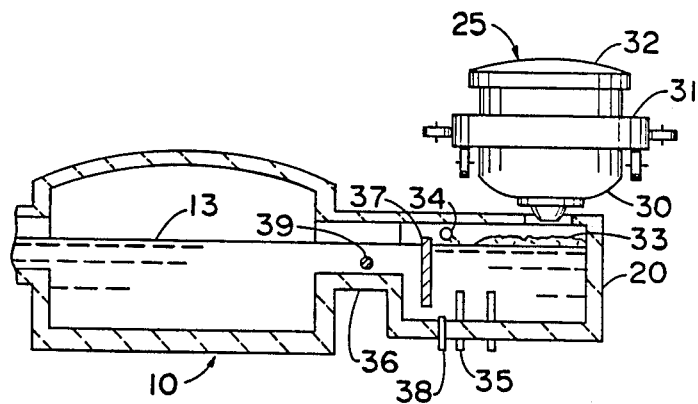
FIG. 3 is a transverse cross-sectional view of the same preferred embodiment, taken along line 3—3 in FIG. 1, showing a preferred type of liquefier associated with one of the channels.

Referring to FIGS. 1 and 2, there is shown a refiner 10 and a conditioner 11 joined by a narrowed waist section 12, all of which are fabricated of conventional refractory ceramic materials normally used for glass melting furnace applications. The refiner 10, conditioner 11, and waist 12 are configured much like a conventional glass melting furnace but with substantially smaller dimensions and with less provision for heating. The refiner is preferably provided with some heating means to bring the molten material 13 to its peak temperature and to help establish the desired circulation patterns within the refiner. To this end, the embodiment depicted is provided with electrodes 14 for passing electric current through the melt so as to resistively heat the melt. A variety of electrode patterns could be employed, the preferred arrangement as illustrated having two groups of double, transverse rows. Combustion burners 15 may also be provided if additional heating capacity is required. Because a substantial portion of the overall energy requirement is provided in the liquifying stage, the heating requirements for the refiner of the present invention are substantially less than for a conventional tank type melting and refining furnace.

As shown in FIG. 1, a pair of channels 20 and 21 lead into the refiner 10 through openings 22 and 23, respectively, in side walls of the refiner. In the arrangement shown, a pair of channels is included, but it should be understood that a larger or smaller number of channels could be provided and that all of the channels need not be in use at any given time. Thus, the system is capable of major incremental changes in throughput. Each channel receives at least partially molten material from a respective liquefying vessel 25, 26. The liquefying stage could assume various configurations as are known in the art, but a particularly advantageous embodiment is that shown in the aforementioned U.S. Pat. No. 4,381,934, wherein a layer of batch material acts as insulation within a rotating vessel and additional batch fed onto the insulating layer is quickly liquefied by intense heat and immediately flows through a bottom opening.

A schematic representation of the preferred liquefying vessel is shown in FIG. 3. The vessel 25 includes a steel drum 30 supported on a circular ring 31, which in turn is mounted for rotation about a vertical axis. A stationary lid 32 may be fitted with a plurality of burners, preferably fired with oxygen, or other heat sources (not shown), and the lid may have an opening (not shown) through which batch materials may be fed into the vessel 25. Additional details of the liquefying process may be found in U.S. Pat. No. 4,381,934.

When glass batch material is liquefied by the preferred embodiment, the liquefied material entering the channel 20 is only partially melted, consisting of a substantial liquid phase including chiefly the soda source material such as soda ash, and a minor solid phase principally including sand grains. The partially melted material at this stage also includes a substantial gas phase consisting mostly of carbon dioxide from decomposition of carbonate mineral batch ingredients. As a result, a foamy layer 33 is usually present on the surface of the material in the channel. Also, as it exits the liquefying vessel, a typical soda-lime-silica glass melt is about 500 to 800 degrees Fahrenheit (270 to 450 degrees Celsius) below the desired peak temperature for refining.

Depending upon the type and quality of glass being produced, the liquefied material received in the channel has had imparted to it a major portion of the total energy requirement for melting and refining. Accordingly, only relatively minor additional amounts of energy need be imparted to the melt, and it has been found advantageous to supply a substantial portion of that energy in the channels before the melt enters the convection refiner. Some of the refining functions, e.g., completing dissolution of sand grains and expelling gases from the melt, may take place in the channels, but the primary function performed in the channels is to increase the temperature of the melt. The temperature is raised in general to about midway between the temperature at which the material enters the channels and the peak refining temperature. By way of example, a glass refined at 2800° F. (1540° C.) is advantageously heated in the channels to about 2300° F. (1260° C.) to 2500° F. (1370° C.). The determining factor in selecting the channel exit temperature is the resulting interaction of the material from the channels on the circulation pattern within the refiner 10, as will be discussed hereinbelow. Heating within the channels may be provided by electrodes 35 as in the embodiment shown in the drawings. Combustion heating means may be used in addition to or in place of the electric heating means.

An advantageous arrangement for providing combustion heating to the channels is the elongated burner 34 having a plurality of burner orifices shown in FIG. 3. This arrangement not only serves to heat the liquefied material, but also, when the burner flames are angled in an upstream direction, serves to retain the foam layer 33 at the upstream end of the channel, thereby lessening the chances for portions of the foam to be passed into the refiner.

Residence time of the melt in the channels need be only sufficient to accomplish the heating function. Thus, each channel is considerably smaller in volume than the refiner, and the channels are preferably narrow in configuration to provide proximity of the melt to the heat sources and to minimize heat loses. Because of the relatively small size of the channel, the foam layer 33 is a short distance from the exit from the channel, and it has been found to be advantageous to provide means to block passage of the foam into the refiner. As mentioned above, the burner 34 may serve this purpose. A more positive restraint for the foam is a barrier 37 deeply submerged in the material in the channel so that only the most dense material from the lowermost portions of the channel pass under the barrier and through the exit from the channel. The barrier 37 may consist of an assemblage of conduits through which coolant (e.g., water) is passed and may project above the level of the liquefied material so that no material passes over the barrier. The submerged portions of the barrier 37 may include graphite sections so as to reduce the cooled surface area. A bubbler 38 may be utilized close to the upstream side of the barrier to counteract downward currents of glass caused by the cooling effect of the barrier 37. Such a downward current could detrimentally draw the less dense surface material into the stream flowing under the barrier 37. The bubbler may comprise a water-cooled tube through which a gas such as air or nitrogen is injected into the molten material. The injected gas bubbles rise, causing an upward entrainment of the molten material in the region above the bubbler. A raised sill portion 36 may be provided at the entrance of each channel onto the refiner in order to direct the material into the upper elevations of the molten material in the refiner. Optionally, the effective elevation of the sill 36 can be varied by means of an insert 39 that may rest on or near the sill. The insert may be a water-cooled pipe or preferably a graphite rod.

Figure 4:
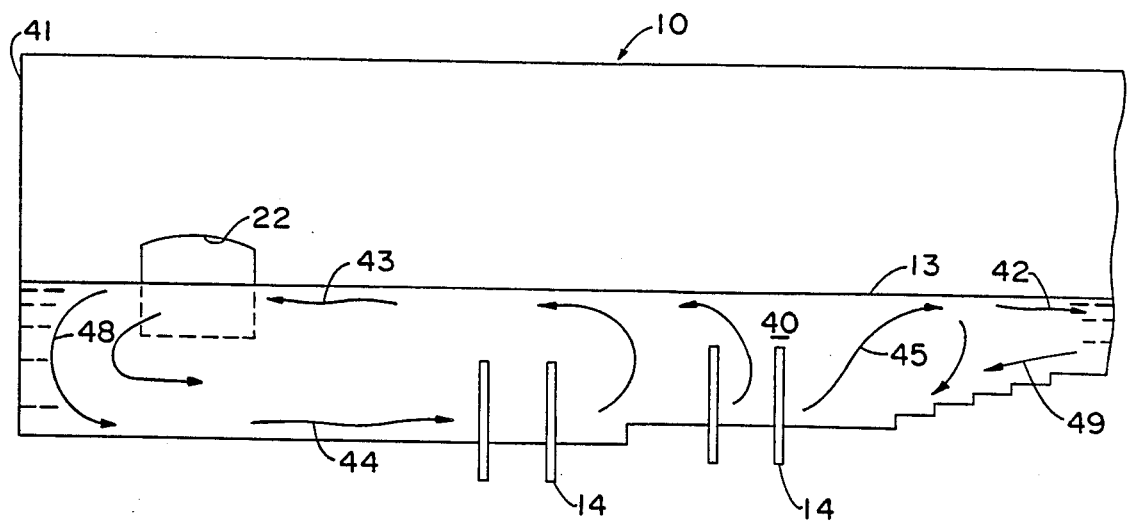
FIG. 4 is an enlarged, schematic view of the left hand portion of the refiner of FIG. 2, showing circulation patterns of the molten material.

A typical circulation pattern is shown in the schematic depiction of a refiner in FIG. 4. A zone 40 of rising currents (the "spring zone" or "hot spot") is established by thermal conditions at a location spaced from the back wall 41 of the refiner. In the preferred embodiment shown, the thermal conditions are provided by the heating produced by the electrodes 14. Applying the majority of the electrical energy to the downstream group of electrodes is preferred. Additionally, or alternatively, combustion burners 15 (FIG. 2) above the melt 13 may be used to provide heat to the refiner. The influx of relatively cool material near the back wall 41 and the additional wall surface area produce a cooling effect on the melt which in turn causes descending currents 48 near the back wall. These descending currents, the ascending currents at the spring zone 40, and the longitudinal temperature gradient (temperature increasing toward the spring zone) establish a circulation cell between the back wall and the spring zone which is counterclockwise as viewed in FIG. 4. This pattern is desirable because it increases the residence time of newly introduced material in the refiner and reduces the probability of newly introduced material flowing directly to the output flow path 42 from the refiner. Thus, each portion of the melt has a greater probability of being fully refined before being carried into the product stream. Additionally, the rearwardly flowing stream 43 at the surface aids in preventing foam and other buoyant inhomogeneities from drifting into the product steeam 42. An oppositely circulating pattern is present downstream from the spring zone, including a return flow along the bottom of relatively cool material from the conditioner 11.

If liquefied material were to be fed directly from the liquefier 25 or 26 into the refiner, the relatively low temperature of the material would cause the newly fed material to sink to the bottom of the refiner where a substantial portion would be likely to join flow stream 44 at the bottom. This would be undesirable because there is a substantial tendency for material from the bottom stream 44 to follow a flow path similar to stream 45 through the downstream side of the spring zone and into the output stream 42. The result would be a short-circuit path through the refiner and undesirably short residence time for unduly large portions of the material, which would yield inadequate refining and degradation of product quality. By heating the material after being liquefied and before entering the refiner, the elevation at which the material enters the circulation cell can be controlled by means of thermal buoyancy. As shown in FIG. 4, the preferred path for material flowing from channel 22 is in the upper portion (i.e., at least the upper half) of the back end circulation cell, with the new material following a path having an initial rearward flow. The result is greater average residence time in the refiner and a resulting better degree of refining for a given volume of refining vessel, so that the size of the refining vessel can be significantly reduced from that ordinarily required.

Excessively heating the material in channel 21 or 22, however, can lead to a disadvantageous flow pattern whereby the material enters at the surface of the melt 13 in the refiner at or above the spring zone temperature, thus counteracting the rearward flow 43 and suppressing the upstream circulation cell. As a result, the thermal barrier against short circuit entry of unrefined material to the output stream 42 provided by the spring zone 40 would be dissipated. For these reasons, it is preferred that the material flowing from the channels is at a temperature approximately midway between the temperature at which it enters the channels and the pbak refining temperature. Expressed differently, a preferred channel exit temperature when processing soda-lime-silica glass may be about 200° F. to 500° F. (110° C. to 280° C. below the peak refining temperature.

Because it is desirable to provide some significant travel toward the back wall of material newly introduced into the refiner from the channel, it is a preferred feature of the present invention that the opening or openings 22, 23 leading into the refiner be spaced from the back wall 41. By way of example, it has been found desirable to space the openings from the back wall at least about one third to one half of the distance between the back wall 41 and the spring zone 40. Ideally, the entry onto the refiner from the channels could be closely adjacent to the spring zone, toward the back wall. In terms of the structure of the refiner, the junction of a channel with the refiner is preferably at least one fourth of the length of the refiner from the back wall.

An optional feature that may be employed to further strengthen the rearward surface flow upstream from the spring zone is to feed cullet near the back wall 41. The cullet may be fed through a tube 46 as shown in FIG. 2. The relatively cool cullet absorbs energy, thereby enhancing the downward current 48 at the back end of the refiner and increasing the longitudinal temperature gradient between the spring zone and the back wall. Other provisions for enhancing the temperature gradient include concentrating the heating toward the outlet end of the refiner (moving the spring zone downstream) or extending the length of the refiner in the direction of the back wall 41.

In the conditioner 11 the molten material is permitted to cool to a temperature suitable for forming into the desired product such as glass sheets. For soda-lime-silica flat glass the forming temperature is typically in the range of 1900° F. to 2100° F. (1040° C. to 1150° C.).

A cooler 47 at the waist 12 between the refiner 10 and the conditioner 11 as shown in FIGS. 1 and 2 may be employed to regulate molten glass flow into the conditioner and the return flow from the conditioner to the refiner. The cooler 47 is immersed in the upper, forwardly flowing portion of the molten glass and serves to retard the forward velocity and to decrease the circulation of material into and out of the conditioner. This has the beneficial effect of increasing the residence time of the forwardly flowing stream between the spring zone and the conditioner, an interval during which the glass is generally at or near its peak temperature and is subjected to optimal refining conditions. Return flow 49 (FIG. 4) from the refiner is part of the downstream circulation cell. Some return flow is desired for adequate refining. At a given rate of product withdrawal, retarding the surface forward flow into the conditioner also retards the bottom return flow 49. Therefore, it has been found desirable to adjust the depth of the waist cooler 47 so as to maintain a volume flow ratio of the total forward flow into the conditioner to the product withdrawal flow rate of at least 1.2 for adequate refining and no more than 2.5 to avoid thermal inefficiency.

The size of a melting furnace is affected by its intended throughput capacity. The resident volume of molten material in a conventional flat glass melting and refining furnace (including the conditioner section) is typically on the order of two to three times the daily (24 hours) throughput volume of glass. It is an indication of its efficiency that with the arrangement of the present invention the resident volume of molten glass in the refiner 10 and conditioner 11 may be less than two times the daily throughput, preferably less than 1.5 times, and a particular embodiment has been designed with the resident volume approximately equal to the intended maximum daily throughput.

Other variations and modifications as would be obvious to those of skill in the art may be resorted to within the scope of the invention as defined by the claims that follow.

We claim:

1. In a method of making glass or the like wherein batch material is liquefied in a first vessel from which the liquefied material flows in an incompletely melted condition and is passed to a separate refiner vessel in which a volume of the material is gathered and heated so as to refine the material, and the refined material is withdrawn from an outlet at one end of the refiner, the improvement comprising receiving the incompletely melted material from the liquefying vessel in an intermediate vessel, heating the material in the intermediate vessel so that the material is passed from the intermediate vessel to the refiner at a temperature between the highest and lowest temperatures of the material in the refiner, maintaining a high temperature zone of the material in the refiner at a location between the outlet and an opposite rear end, maintaining a decreasing temperature gradient between the high temperature zone and the rear end so as to induce a rearward surface flow of material from the high temperature zone toward the rear end thereby establishing a horizontally elongated recirculating flow pattern that serves to extend the residence time of the material in the refiner, passing the material from the intermediate vessel into the refiner at a location between the high temperature zone and the rear end so as to enter directly into the rearward surface flow.

2. The method of claim 1 wherein the material flows from the intermediate vessel to the refiner vessel in a direction transverse to the rearward surface flow.

3. The method of claim 1 wherein a substantially greater volume of material is retained in the refiner vessel than in the intermediate vessel.

4. The method of claim 1 wherein the material is liquefied at two or more locations and passed to the refiner by way of two or more respective intermediate vessels.

5. The method of claim 1 wherein surface flow of low density material from the intermediate vessel is blocked.

6. The method of claim 1 wherein soda-lime-silica glass is being produced and the temperature of the material is raised in the intermediate vessel to within 200° F. to 500° F. of the peak temperature attained by the glass within the refiner vessel.

7. A method of making glass or the like comprising liquefying batch material and permitting the liquefied material to flow freely from the liquefying zone before it has completely melted, receiving the liquefied material in a horizontally extending channel of relatively narrow width where its temperature is increased, passing the material to a relatively wide refining vessel where its temperature is increased further, withdrawing refined molten material from an outlet end of the refining vessel, and the material entering the refining vessel from the channel is at a temperature compatible with joining a flow stream in the refining vessel that initially flows in a direction substantially away from the outlet end.

8. The method of claim 7 wherein material from the channel enters a side portion of the refining vessel.

9. The method of claim 8 wherein the material from the channel enters the refining vessel at 200° F. to 500° F. below the maximum temperature attained by the material in the refining vessel.

10. The method of claim 9 wherein the glass is a soda-lime-silica flat glass.

11. Apparatus for making glass or the like comprising:
   a liquefying vessel having means for feeding pulverulent batch material into the vessel, means for heating the interior of the vessel to a liquefying temperature of the batch material, and a batch support surface extending to a drain opening;
   a channel aligned with the drain opening adapted to receive liquefied material from the liquefying vessel, means for heating the liquefied material in the channel;
   a refining vessel communicating with the channel so as to receive molten material from the channel, the refining vessel having a substantially greater area than the channel, means for heating the material in the refining vessel adapted to provide a relatively high temperature zone in a portion of the material in the refiner, and an outlet opening for withdrawing molten material from the refining vessel at a location spaced from the channel;
   wherein the refining vessel has a longitudinal dimension extending horizontally from a back wall toward the outlet opening with side walls extending substantially in the longitudinal direction, and the channel communications with the interior of the refining vessel through an opening in a side wall portion between the back wall and the high temperature zone.

12. The apparatus of claim 11 wherein the channel extends transversely to the longitudinal dimension of the refining vessel.

13. The apparatus of claim 11 wherein at least two liquefying vessels and at least two channels are associated with the refining vessel.

14. The apparatus of claim 11 wherein the opening from the channel to the refiner is above the bottom of the refiner at that region.

15. The apparatus of claim 11 wherein the channel is provided with electric heating means.

16. The apparatus of claim 11 wherein the channel provides a passageway for molten material from the liquefying vessel to the refining vessel that is greater in length than in width.

17. The apparatus of claim 11 wherein the side wall opening is spaced from the back wall at least one fourth of the longitudinal dimension of the refining vessel.

18. The apparatus of claim 14 wherein the channel at its end near the opening onto the refiner is provided with barrier means for preventing surface flow of low density material through the opening.

* * * * *